(12) United States Patent
Bernard et al.

(10) Patent No.: US 9,993,113 B2
(45) Date of Patent: *Jun. 12, 2018

(54) FILTRATION DEVICE FOR COOKING OIL

(71) Applicant: Clarification Technology, Inc., Kirkland, WA (US)

(72) Inventors: Robin D. Bernard, Kirkland, WA (US); Jiri Prokop, Náchod (CZ)

(73) Assignee: Clarification Technology, Inc., Kirkland, WA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/252,067

(22) Filed: Aug. 30, 2016

(65) Prior Publication Data

US 2016/0367080 A1    Dec. 22, 2016

Related U.S. Application Data

(63) Continuation of application No. 13/621,524, filed on Sep. 17, 2012, now Pat. No. 9,452,374.

(60) Provisional application No. 61/536,979, filed on Sep. 20, 2011.

(51) Int. Cl.
| | |
|---|---|
| *B01D 29/07* | (2006.01) |
| *A47J 37/12* | (2006.01) |
| *B01D 29/11* | (2006.01) |
| *B01D 43/00* | (2006.01) |

(52) U.S. Cl.
CPC .......... *A47J 37/1223* (2013.01); *B01D 29/07* (2013.01); *B01D 29/111* (2013.01); *B01D 43/00* (2013.01)

(58) Field of Classification Search
None
See application file for complete search history.

(56) References Cited

U.S. PATENT DOCUMENTS

| | | |
|---|---|---|
| 2,477,404 A | 7/1949 | Butt, Jr. |
| 3,210,193 A | 10/1965 | Martin |
| 3,263,596 A | 8/1966 | Thomas |
| 3,279,605 A | 10/1966 | Shepherd |
| 3,327,859 A | 6/1967 | Pall |
| 3,646,882 A | 3/1972 | Keating |
| 3,759,388 A | 9/1973 | Thomason |
| 3,849,312 A | 11/1974 | Wecker, Sr. |
| 3,933,643 A | 1/1976 | Colvin et al. |
| 3,968,741 A | 7/1976 | Hunt |
| 4,025,438 A | 5/1977 | Gelman et al. |

(Continued)

FOREIGN PATENT DOCUMENTS

WO     2010/074909 A1    7/2010

*Primary Examiner* — Robert James Popovics
(74) *Attorney, Agent, or Firm* — Seed IP Law Group LLP

(57) ABSTRACT

A filtration device to filter cooking oil is provided having an upper layer comprised of a filter paper and a lower layer comprised of a filter pad. The filter paper of the upper layer includes pleats defining a plurality of food particle receiving channels over a substantial portion of a central area of the filter paper. The filter pad is attached to a peripheral portion of the filter paper to form a multi-layered filtration device having a central pleated region in which the upper and the lower layers are unbonded to each other. The central pleated region is configured to accumulate food particles above a threshold size as the filter paper and filter pad cooperatively filter cooking oil during a filtration operation. Methods of making and using filtration devices are also provided.

16 Claims, 3 Drawing Sheets

(56) References Cited

U.S. PATENT DOCUMENTS

| | | | |
|---|---|---|---|
| 4,043,916 A | 8/1977 | Wecker, Sr. |
| 4,328,097 A | 5/1982 | Whaley et al. |
| 4,517,082 A | 5/1985 | Prudhomme |
| 4,549,887 A | 10/1985 | Joannou |
| 4,591,434 A | 5/1986 | Prudhomme |
| 4,604,203 A | 8/1986 | Kyle |
| 4,702,827 A | 10/1987 | Wenzel |
| 4,871,454 A | 10/1989 | Lott |
| 4,959,144 A | 9/1990 | Bernard et al. |
| 4,994,181 A | 2/1991 | Mullaney, Jr. |
| 5,038,775 A | 8/1991 | Maruscak et al. |
| 5,052,385 A | 10/1991 | Sundström |
| 5,143,604 A | 9/1992 | Bernard et al. |
| 5,211,159 A | 5/1993 | Lieblein et al. |
| 5,222,488 A | 6/1993 | Forsgren |
| 5,292,432 A | 3/1994 | Jainek et al. |
| 5,330,638 A | 7/1994 | Burklund et al. |
| 5,354,455 A | 10/1994 | Burklund et al. |
| 5,439,601 A | 8/1995 | Burklund et al. |
| 5,449,469 A | 9/1995 | Burklund et al. |
| 5,458,772 A | 10/1995 | Eskes et al. |
| 5,595,107 A | 1/1997 | Bivens |
| 5,601,715 A | 2/1997 | Middleton et al. |
| 5,620,505 A | 4/1997 | Koch et al. |
| 5,656,368 A | 8/1997 | Braun et al. |
| 5,690,713 A | 11/1997 | Bowerman et al. |
| 5,709,899 A | 1/1998 | Bivens |
| 5,731,024 A | 3/1998 | Bivens |
| 5,863,424 A | 1/1999 | Lee |
| 5,870,945 A | 2/1999 | Bivens |
| 6,050,262 A | 4/2000 | Jay |
| 6,095,037 A | 8/2000 | Savage et al. |
| 6,161,540 A | 12/2000 | Fecteau |
| 6,312,598 B1 | 11/2001 | Munson et al. |
| 6,371,307 B1 | 4/2002 | Eskes |
| 6,482,326 B2 | 11/2002 | Munson et al. |
| 6,623,634 B1 | 9/2003 | Whitehurst |
| 6,764,533 B2 | 7/2004 | Lobiondo, Jr. |
| 6,860,916 B2 | 3/2005 | Kubokawa et al. |
| 6,874,499 B2 | 4/2005 | Viner et al. |
| 6,955,702 B2 | 10/2005 | Kubokawa et al. |
| 7,150,774 B2 | 12/2006 | Kubokawa et al. |
| 7,156,891 B2 | 1/2007 | Winters et al. |
| 7,247,237 B2 | 7/2007 | Mori et al. |
| 8,066,889 B2 | 11/2011 | Bivens et al. |
| 9,452,374 B2 * | 9/2016 | Bernard | B01D 29/07 |
| 2002/0050474 A1 | 5/2002 | Munson et al. |
| 2002/0069767 A1 | 6/2002 | Wendel et al. |
| 2004/0055604 A1 | 5/2004 | Viner et al. |
| 2005/0160709 A1 | 7/2005 | Hollis |
| 2006/0013931 A1 | 1/2006 | Bivens et al. |
| 2007/0289927 A1 | 12/2007 | Bivens et al. |
| 2009/0249957 A1 | 10/2009 | Lackey, Sr. |
| 2009/0250414 A1 | 10/2009 | Bivens et al. |
| 2010/0071324 A1 | 3/2010 | Alexander et al. |
| 2011/0288319 A1 | 11/2011 | Profughi et al. |
| 2013/0075347 A1 | 3/2013 | Bernard et al. |
| 2015/0230661 A1 | 8/2015 | Clayson |
| 2016/0367080 A1 * | 12/2016 | Bernard | B01D 29/07 |

* cited by examiner

FILTRATION DEVICE FOR COOKING OIL

CROSS-REFERENCE TO RELATED APPLICATIONS

This application is a continuation of U.S. patent application Ser. No. 13/621,524, filed Sep. 17, 2012, which claims benefit to U.S. Provisional Patent Application No. 61/536,979, filed Sep. 20, 2011, the entire contents of which are hereby incorporated by reference in their entireties.

BACKGROUND

Technical Field

This disclosure generally relates to filters and, more particularly, to filters employed in filtering hot cooking oil such as that used in commercial or industrial deep fryers.

Description of the Related Art

Cooking oils, such as those used in commercial or industrial deep fryers, tend to become contaminated with moisture, carbonized food particles, and the like during the frying process. Additionally, the oils themselves tend to break down chemically after extended use. Both the contaminants and the chemical breakdown byproducts have the undesirable characteristics of causing the oil to foam, smoke, smell bad, possess an unsightly appearance, and/or impart a bad taste to the fried food. It has been found that keeping the cooking oil clean by removing the particulate matter and filtering it on a regular basis tends to extend the useful life of the cooking oil and increase the quality and appearance of foods which are cooked therein.

Previous cooking oil filter media include wire mesh strainers, coarse paper, and diatomaceous earth or similar filtering material. Wire mesh strainers are restricted to the removal of large particulate matter. Conventional coarse paper filters (having a pore size of from 4 to 80 microns with a mean pore size on the order of 10 microns) exhibits only moderate filtering effectiveness. Diatomaceous earth and similar filtering materials usually exist in a loose form that is messy and awkward to handle.

Other known cooking oil filter media include filter sheet or filter pad media having a substantially planar form and which combine various filtration mechanisms over a depth of the sheet or pad to filter cooking oil in a particularly efficient manner. The filters described in U.S. Pat. No. 4,988,440, the entire content of which is incorporated herein by reference in its entirety, provide examples of such filter media. Other examples of filter pad devices which are particularly effective in filtering cooking oil are marketed by Clarification Technology, Inc of Kirkland, Wash. under the trademark SuperSorb®.

Though filter pad devices, such as those identified above, and other known filter devices provide generally effective means of filtering cooking oil, such known filtration devices nevertheless require periodic replacement at intervals which can be particularly disruptive and which result in significant downtime of host fryer systems. For example, fryer systems in the fast food restaurant industry often require servicing one or more times during any given work shift to replace filter elements.

BRIEF SUMMARY

Embodiments described herein provide multi-layered filtration devices which are particularly well adapted for filtering hot cooking oil (also referred to as frying oil), such as that used in commercial and industrial deep fryers, in a manner that maintains the quality of the cooking oil throughout prolonged service intervals. The multi-layered filtration devices include a filter paper, such as, for example, C-90 filter paper manufactured by the Ahlstrom Corporation of Helsinki, Finland, which is securely attached to a filter pad, such as, for example, the SuperSorb® White hot frying oil filter pad manufactured by HOBRA-Skolnik s.r.o. of Broumov, Czech Republic. The filter paper has a central pleated region configured to accumulate food particles above a threshold size as the filter paper and filter pad cooperatively filter cooking oil during a filtration operation. In some embodiments, combinations of effective surface area of the filter device and the effective filter volume of the device provide effective filtering of cooking oil while maintaining a particularly compact form factor. In addition, the effective surface area of the filter device and the effective filter volume of the device may be selected to enable filtration of cooking oil over the course of an entire work day without the need to replace the filtration device. Accordingly, a host frying system may uninterruptedly produce multiple batches of prepared food products, such as, for example, fried chicken nuggets, over the course of an entire work day.

According to one embodiment, a filtration device to filter cooking oil may be summarized as including: an upper layer comprised of a filter paper, the filter paper having pleats defining a plurality of food particle receiving channels over a substantial portion of a central area of the filter paper; and a lower layer comprised of a filter pad, the filter pad stitched to a peripheral portion of the filter paper around at least a majority of the perimeter of the filter paper to form a multi-layered filtration device having a central pleated region in which the upper and the lower layers are unbonded to each other, the central pleated region configured to accumulate food particles above a threshold size as the filter paper and filter pad cooperatively filter cooking oil during a filtration operation.

Although the filtration device may include other functional elements, in one particularly advantageous embodiment, the filtration device consists essentially of an upper layer comprised of a pleated filter paper, a lower layer comprised of a filter pad, and stitching along the peripheral edge of the filtration device for coupling the two layers together. The filter pad and filter paper may include materials such as silicates, bleaching earth, and other materials effective to remove unwanted components from the cooking oil during the filtering process.

DETAILED DESCRIPTION

In the following description, certain specific details are set forth in order to provide a thorough understanding of various disclosed embodiments. However, one skilled in the relevant art will recognize that embodiments may be practiced without one or more of these specific details. In other instances, well-known structures or steps associated with cooking oil filtration devices and mechanisms may not be shown or described in detail to avoid unnecessarily obscuring descriptions of the embodiments. For instance, it will be appreciated by those of ordinary skill in the relevant art that the filter paper described herein may be manufactured using one or more various fibers, including natural fibers, synthetic fibers, and/or hybrid fibers and may be manufactured to have different porosities to filter particles of varying threshold sizes.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Figure 1:
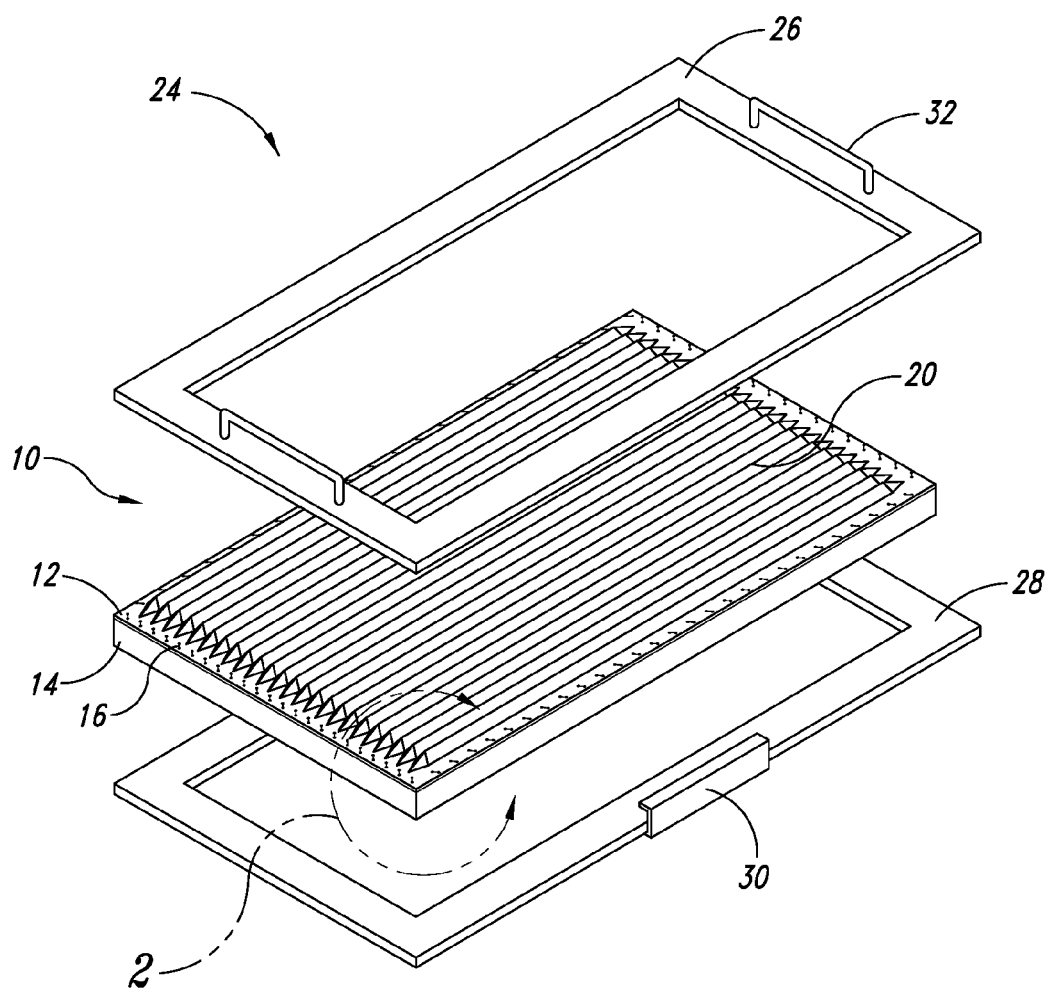
FIG. 1 is an isometric view of a filtration device, according to one embodiment, shown between opposing frame members.

FIGS. 1 through 5 show a filtration device 10, according to one example embodiment, which is particularly well adapted for filtering hot cooking oil in a fryer system 50 (FIG. 5) to prepare food products, such as, for example, fried chicken nuggets. As shown in FIG. 1, the filtration device is formed as a multi-layer filter including an upper layer 12 and a lower layer 14. In the example embodiment, the upper layer 12 is a paper filter element characterized as a relatively thin, planar filter media, such as, for example, C-90 filter paper manufactured by the Ahlstrom Corporation of Helsinki, Finland. The lower layer 16 is a filter pad element characterized as a relatively thick, planar filter media, such as, for example, the SuperSorb® White hot frying oil filter pad manufactured by HOBRA-Skolnik s.r.o. Broumov, Czech Republic. It should be understood that the SuperSorb® White filter pad is an example of one filter pad element, and that other filter pad elements suitable of use in embodiments of the subject matter described herein are available from companies, such as, for example, Clarification Technologies, Inc. of Kirkland, Wash.

In the example embodiment, the upper layer 12 is attached to the lower layer via stitching 16 around the entire perimeter of the filtration device 10. In other embodiments, the stitching 16 may be provided intermittently in regular or irregular intervals around the periphery of the filtration device 10. In still other embodiments, the upper layer 12 and the lower layer 14 may be attached together via other mechanisms, such as, for example, clips, clamps or other fastening devices. In any event, the upper layer 12 comprised of a filter paper and the lower layer 14 comprised of the filter pad are secured together at a peripheral portion such that the layers 12, 14 remain unbonded in a central region of the filtration device 10 where they may separate slightly during a filtration operation. Securing the layers 12, 14 together in this manner enables the filtration device 10 to be manufactured in a particularly efficient manner. In other embodiments, the layers 12, 14 may be bonded or attached to each other in the central region, such as, for example, by stitching or other attachment mechanisms.

As further shown in FIG. 1, the upper layer 12 comprised of a filter paper may be formed to include a plurality of longitudinally extending pleats 20 over at least a substantial portion of the central region of the filtration device 10. Although the example embodiment is illustrated as having twenty-four pleats 20, it is appreciated that in particularly advantageous embodiments, the number of pleats 20 are greater than sixty, and in some embodiments, greater than eighty-five, while maintaining a pleat width W (FIG. 4) in the range of between about 3 mm and about 5 mm. In addition, although the pleats 20 are illustrated as converging to a flat surface toward the edge of the filtration device 10 at longitudinal ends thereof, it is appreciated that the entire longitudinal length of the filter paper may be uniformly pleated and then compressed, folded and/or distorted at the longitudinal ends by a stitching process. The stitching process may be performed in an automated or semi-automated manner in coordination with a folding operation which creates the pleats 20. A heat treatment may be applied to the filter paper to set the pleats 20.

Figure 5:
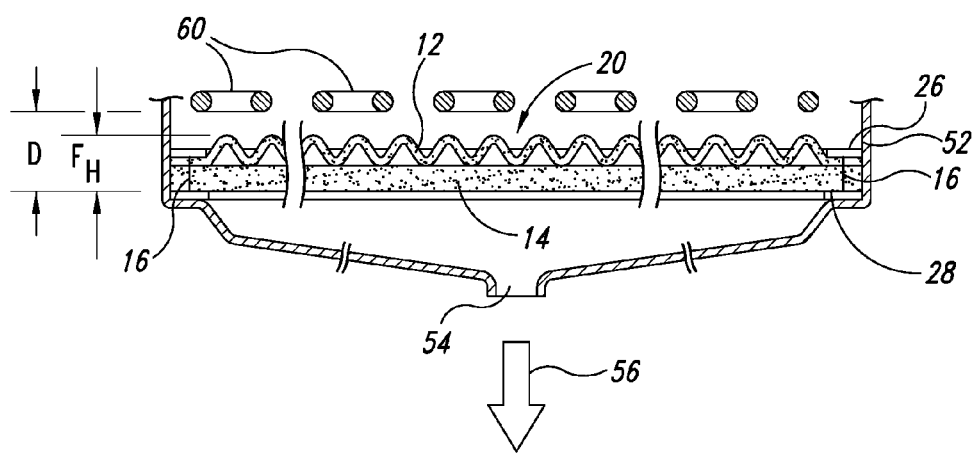
FIG. 5 is a cross-sectional view of the filtration device of FIG. 1 with the filtration device shown mounted in a fryer system.

As further shown in FIG. 1, the filtration device 10 may be received between one or more rigid frame members 26, 28 to provide rigidity to the filtration device 10 to facilitate mounting in a host fryer system 50 (FIG. 5). The frame members 26, 28 may include fastening devices 30, such as, for example, clips, clamps or other devices, for securing a peripheral portion of the filtration device 10 between the frame members 26, 28. In some embodiments, an upper frame member 32 may be provided to secure the filtration device 10 to a frame or shelf which is integrally formed in the host fryer system 50. A handle 32 or other feature to assist in manipulating the filtration device 10 may also be provided on or integrated with one or more of the frame members 26, 28.

Figure 2:
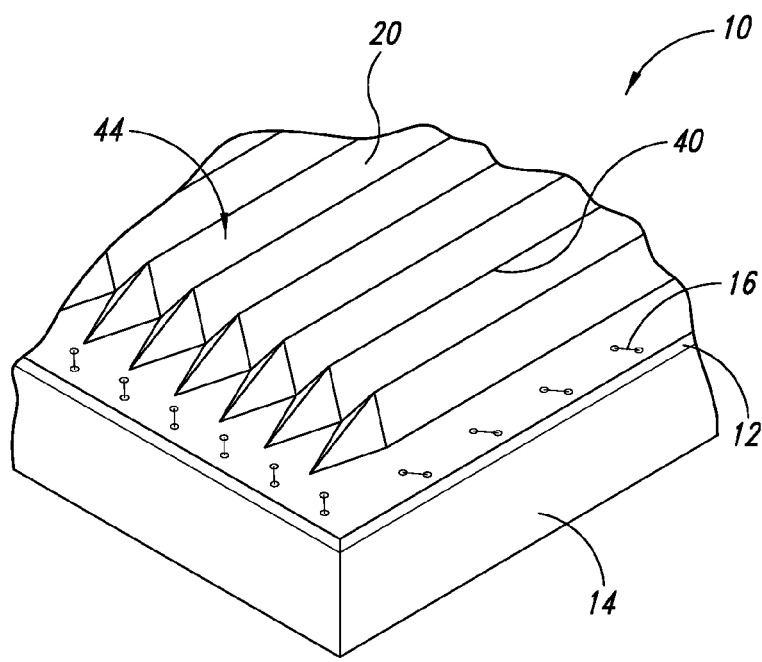
FIG. 2 is an enlarged detail view of a portion of the filtration device of FIG. 1.

FIG. 2 is a detail view of a portion of the filtration device 10 illustrating, among other things, the relative thicknesses of the upper and lower layers 12, 14. As can be appreciated from FIG. 2, the thickness $T_{UL}$ of the upper layer 12 comprised of a paper filter is several magnitudes smaller than a thickness $T_{LL}$ of the lower layer 14. For instance in some embodiments, the upper layer 12 may have a thickness $T_{UL}$ of about 0.20 mm±0.05 mm and the lower layer 14 may have a thickness $T_{LL}$ of about 3.10 mm±0.10 mm. In some embodiments, a ratio of a thickness $T_{LL}$ of the filter pad of the lower layer 14 to a thickness $T_{UL}$ of the filter paper of the upper layer 12 is greater than ten, and in some embodiments, greater than fifteen. The relatively thin upper layer 12 provides a medium for creating the pleats 20 which project from the surface of the filter pad of the lower layer 14 to define a series of ridges 40 and valleys 42 (FIGS. 4 and 5) and a series of food particle receiving channels 44. The food particle receiving channels 44 are configured to accumulate food particles, (e.g., bread crumbs) above a threshold size as the filter paper of the upper layer 12 and the filter pad of the lower layer 14 cooperatively filter cooking oil during a filtration operation.

Figure 3:
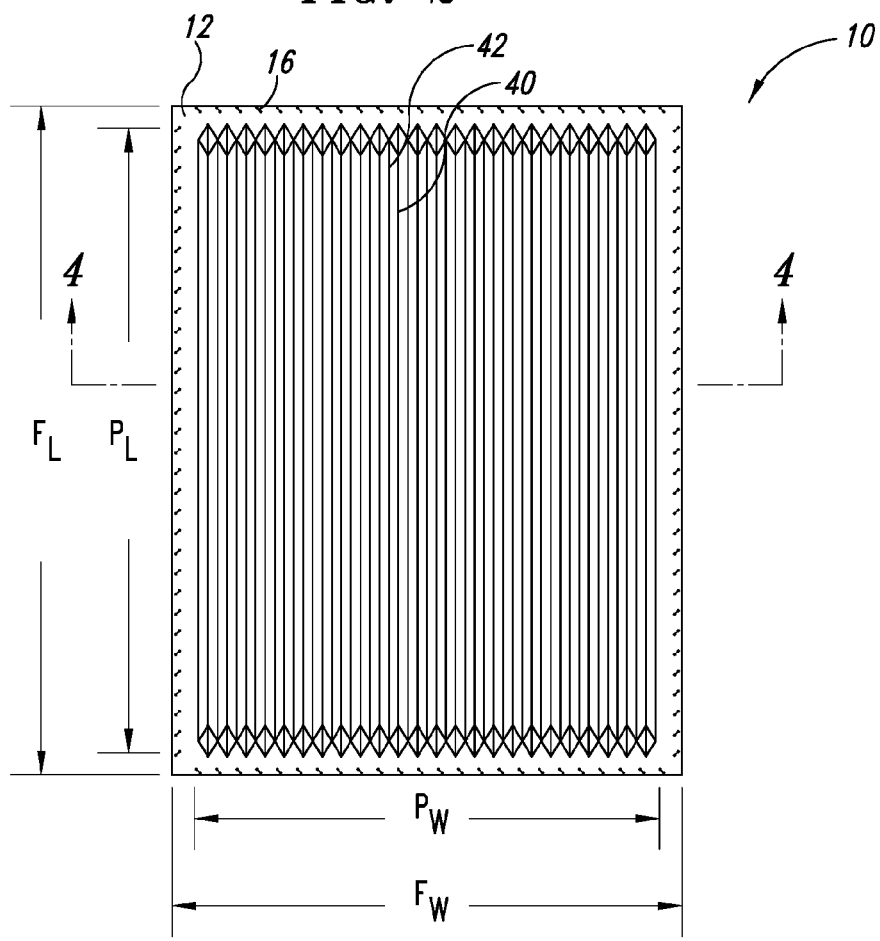
FIG. 3 is a top plan view of the filtration device of FIG. 1.

FIG. 3 shows a top plan view of the filtration device 10 and illustrates the pleated nature of the upper layer 12 over a substantial portion of the projected area of the filtration device 10 when viewed from above. In the illustrated embodiment, the filtration device 10 is shown as having a generally rectangular shape characterized by a filter length $F_L$ and a filter width $F_W$ and the effective filtration area is shown as having a generally rectangular shape characterized by an overall collective pleat length $P_L$ and an overall collective pleat width $P_W$. In some embodiments, the area defined by the overall collective pleat length $P_L$ and the overall collective pleat width $P_W$ is more than ninety percent of the area defined by the filter length $F_L$ and the filter width $F_W$. In some embodiments, the filtration device 10 may be of a different shape, such as, for example, a circular shape, but may nevertheless be substantially filled with longitudinally extending pleats. In this manner, irrespective of the outer profile of the filtration device 10, the internal area is dominated by the presence of a pleated filter structure which defines food particle receiving channels 44 to accommodate particles of food above a threshold size which are prefiltered by the upper layer 12 of the filter device 10 during the filtration process.

Figure 4:
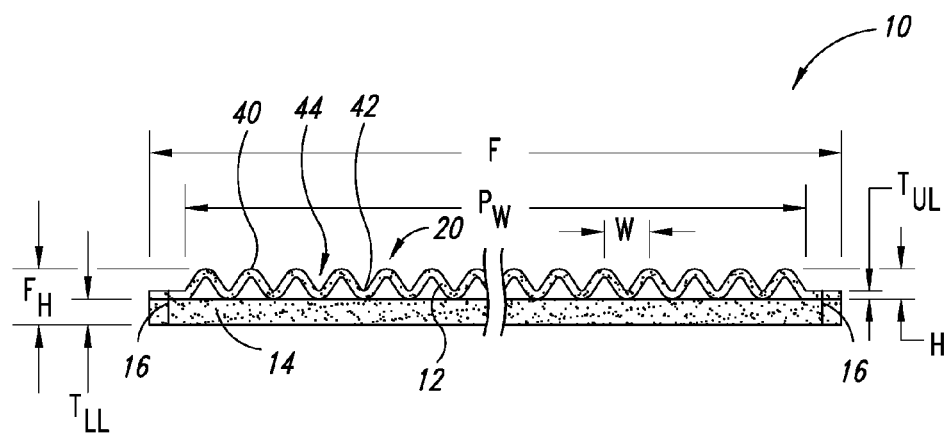
FIG. 4 is a cross-sectional view of the filtration device of FIG. 1, taken along line 4-4 of FIG. 3.

FIG. 4 provides a cross-section view of the filtration device 10 of the example embodiment. As shown in this figure, the pleats 20 generally extend from one side of the filter device 10 to the opposing side of the filter device 10 in a saw-tooth or undulating fashion. The pleats 20 are characterized by a pleat height H and a pleat width W and define food particle receiving channels 44 that can be approximated to have a volume corresponding to half of the pleat height H multiplied by the pleat width W and multiplied by the overall collective pleat length $P_L$. This resulting volume may be multiplied by the number of pleats 20 to define an overall effective particle collection volume. In some embodiments, the overall effective particle collection volume of the filtration device 10 combined with the volume of the filter pad of the lower layer 14 and divided by the volume of the filter pad is greater than or equal to 2.25, and in other embodiments, greater than 2.75. In other words, a sum of an aggregate volume of the food particle receiving channels 44 and a volume of the filter pad divided by the volume of the filter pad is greater than or equal to 2.25 in some embodiments, and greater than or equal to 2.75 in other embodiments. In this manner, the effective volume provided by the filter pad for filtering the cooking oil is particularly well balanced with respect to the volume of the food particle receiving channels 44 which are available for storing larger food particles (e.g., bread crumbs) that are filtered from the cooking oil prior to the cooking oil passing through the filter pad of the lower layer 14.

An aspect ratio of the pleats 20 or receiving channels 44 may be generally defined by the pleat height H divided by the pleat width W. In some embodiments, this aspect ratio is greater than or equal to 1.25, and in other embodiments, is great than or equal to 1.75. In this manner, the pleats 20 and receiving channels 44 are taller than they are wide and present a significant increase in effective surface area for filtering cooking oil through a first stage of the filtration process via the upper layer 12.

An upper surface area of the filter paper of the upper layer 12 may be approximated by multiplying each of the number of pleats, the pleat height H and the overall collective pleat length $P_L$ together and doubling the result. According to some embodiments, a ratio of this approximated upper surface area of the filter paper to an upper surface area of the filter pad of the lower layer 14 underlying the filter paper is greater than or equal to 2.50. In other embodiments, the ratio of the upper surface area of the filter paper of the upper layer 12 to an upper surface area of the filter pad of the lower layer 14 is greater than or equal to 3.50. In this manner, the upper layer 12 effectively increases the available surface area of the filtration device 10 for filtering the cooking oil while maintaining a relatively compact and efficient form factor.

The following table provides a summary of selected characteristics of two particularly advantageous embodiments which are effective in filtering cooking oil in a manner which enables significantly prolonged service intervals when compared to conventional filtering devices.

TABLE 1

Selected Characteristics of Example Embodiments

| $F_W$ (mm) | $F_L$ (mm) | $T_{LL}$ (mm) | $T_{UL}$ (mm) | H (mm) | W (mm) | Pleats (#) |
|---|---|---|---|---|---|---|
| 286 | 486 | 3.1 | 0.2 | 6.0 | 4.4 | 65 |
| 378 | 486 | 3.1 | 0.2 | 8.0 | 4.4 | 86 |

FIG. 5 shows the filtration device 10 installed in a fryer system 50. More particularly, the filtration device 10 is shown positioned within a receptacle or container 52 of the fryer system 50 that is configured to receive cooking oil for preparing food products (e.g., fried chicken nuggets). The cooking oil receptacle or container 52 includes an outlet 54 at a lower end thereof for discharging filtered cooking oil, as represented by the arrow labeled 56. The filtered cooking oil which is discharged may be recycled for reuse in the frying system 50 to prepare additional batches of food products. Heating elements 60 may be positioned within the container 52 for selectively heating the cooking oil during a food preparation operation. The heating elements 60 may be offset from a mounting surface of the filtration device 10 by an offset distance D. In some embodiments, a ratio of this offset distance D to an overall height $F_H$ of the multi-layered filtration device 10 may be less than or equal to two. In this manner, an exterior envelope of the filtration device may occupy a majority of the space between the mounting surface of the filtration device and the heating elements 60. The frying system 50 may maintain a relatively small form factor as a result, of among other things, the compact form of the filtration device 10.

The filter devices 10 described herein may be used to maintain the quality of cooking oil in a fryer system 50 throughout successive batches of food preparation. More particularly, the cooking oil may be passed through the multi-layered filtration device 10 after a plurality of successive batches of food products are prepared and recycled back to container 52. Thereafter, another plurality of successive batches of food products may be prepared followed be another filtration operation in which the cooking oil is again passed through the multi-layered filtration device 10 and returned to the container 52. As described above, this process may be repeated on a batch basis, for example, throughout a work day or work shift at a fast food restaurant without replacing the filter element and without significantly jeopardizing the quality of the cooking oil or efficiency of the fryer system. In alternative applications, the process may be carried out on a continuous basis during the work day or work shift. In some instances, the multi-layered filtration device may be replaced after particles of the prepared food products (e.g., bread crumbs) accumulate in the food particle receiving channels 44 to fill at least a majority of the volume collectively defined by the food particle receiving channels 44. In other instances, the multi-layered filtration device 10 may be replaced after particles of the prepared food products (e.g., bread crumbs) substantially fill the entirety of the volume collectively defined by the food particle receiving channels 44. In still other instances, the multi-layered filtration device 10 may be replaced after a predetermined number of filtration cycles.

Although the filter devices 10 of the example embodiment illustrated in FIGS. 1 through 5 are shown comprising two distinct layers, it is appreciated that in some embodiments one or more additional filter layers may be provided. In addition, although a shape of the food particle receiving channels 44 is shown as being generally triangular, it is appreciated that in some embodiments the shape of the food receiving channels 44 may be different. For example, in some embodiments, as shown in FIGS. 4 and 5, the shape of the receiving channels 44 may be substantially sinusoidal. Still further, the various embodiments described above can be combined to provide further embodiments. For example, the filter paper may include materials such as silicates, bleaching earth, and other materials effective to remove unwanted components from the cooking oil during a filtering process.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A filtration system for cooking oil received in a fryer, the filtration system comprising:
   a container to receive cooking oil to prepare food products;
   one or more heating elements positioned in the container to selectively heat food products during a frying operation; and
   a multi-layered filtration device positioned downstream of the one or more heating elements for filtering out food particles from the cooking oil, the multi-layered filtration device including:
   an upper layer comprised of a filter paper, the filter paper having pleats defining a plurality of food particle receiving channels over a substantial portion of a central area of the filter paper; and
   a lower layer comprised of a filter pad, the filter pad attached to a peripheral portion of the filter paper around at least a majority of the perimeter of the filter paper to form a multi-layered filtration device having a central pleated region in which the upper and the lower layers are unbonded to each other.

2. The filtration system of claim 1 wherein a ratio of a thickness of the filter pad to a thickness of the filter paper is greater than fifteen.

3. The filtration system of claim 1 wherein an aspect ratio of the receiving channels of the filter paper defined by a ratio of a height of a receiving channel to a width of the receiving channel is greater than or equal to 1.25.

4. The filtration system of claim 1 wherein an aspect ratio of the receiving channels of the filter paper defined by a ratio of a height of a receiving channel to a width of the receiving channel is greater than or equal to 1.75.

5. The filtration system of claim 1 wherein a ratio of the upper surface area of the filter paper to an upper surface area of the filter pad is greater than or equal to 2.50.

6. The filtration system of claim 1 wherein a ratio of the upper surface area of the filter paper to an upper surface area of the filter pad is greater than or equal to 3.50.

7. The filtration system of claim 1 wherein a total volume capacity ratio of the filtration device defined by a sum of an aggregate volume of the food particle receiving channels and a volume of the filter pad divided by the volume of the filter pad is greater than or equal to 2.25.

8. The filtration system of claim 1 wherein a total volume capacity ratio of the filtration device defined by a sum of an aggregate volume of the food particle receiving channels and a volume of the filter pad divided by the volume of the filter pad is greater than or equal to 2.75.

9. The filtration system of claim 1 wherein a ratio of a height of the receiving channels of the filter paper to a thickness of the filter pad is equal to or greater than two.

10. The filtration system of claim 1 wherein a shape of each of the receiving channels is substantially triangular.

11. The filtration system of claim 1 wherein a shape of the receiving channels is substantially sinusoidal.

12. The filtration system of claim 1 wherein the filter pad is attached to the filter paper only by stitching at the perimeter of the filter paper.

13. A filtration system for cooking oil received in a fryer, the filtration system comprising:
   a container to receive cooking oil to prepare food products;
   one or more heating elements positioned in the container to selectively heat food products during a frying operation; and
   a multi-layered filtration device positioned downstream of the one or more heating elements for filtering out food particles from the cooking oil, the multi-layered filtration device including:
   an upper layer comprised of a filter paper, the filter paper having pleats defining a plurality of food particle receiving channels over a substantial portion of a central area of the filter paper;
   a lower layer comprised of a filter pad; and
   stitching attaching the pad to a peripheral portion of the filter paper around at least a majority of the perimeter of the filter paper to form a multi-layered filtration device having a central pleated region in which the upper and the lower layers are unbonded to each other.

14. A filtration system for cooking oil received in a fryer, the filtration system comprising:
   a container to receive cooking oil to prepare food products;
   one or more heating elements positioned in the container to selectively heat food products during a frying operation; and
   a multi-layered filtration device positioned downstream of the one or more heating elements for filtering out food particles from the cooking oil, the multi-layered filtration device including an upper layer comprised of a filter paper bonded at a peripheral portion thereof to a lower layer comprised of a filter pad, the filter paper of the upper layer having a plurality of food particle receiving channels.

15. The filtration system of claim 14 wherein the filter pad of the lower layer is generally planar and has a thickness less than half of a height of the food particle receiving channels of the filter paper of the upper layer.

16. The filtration system of claim 14, further comprising:
   a frame to selectively install the multi-layered filtration device downstream of the one or more heating elements.

* * * * *